US008901218B2

(12) United States Patent
Kim et al.

(10) Patent No.: US 8,901,218 B2
(45) Date of Patent: *Dec. 2, 2014

(54) BRANCHED (METH)ACRYLATE COPOLYMER WITH HIGH REFRACTIVE INDEX AND METHOD FOR PREPARING THE SAME

(75) Inventors: Il Jin Kim, Ansan-si (KR); Kee Hae Kwon, Gunpo-si (KR)

(73) Assignee: Cheil Industries Inc., Gumi-si (KR)

( * ) Notice: Subject to any disclaimer, the term of this patent is extended or adjusted under 35 U.S.C. 154(b) by 77 days.

This patent is subject to a terminal disclaimer.

(21) Appl. No.: 12/792,176

(22) Filed: Jun. 2, 2010

(65) Prior Publication Data

US 2010/0240831 A1 Sep. 23, 2010

Related U.S. Application Data

(63) Continuation-in-part of application No. PCT/KR2008/007157, filed on Dec. 4, 2008.

(30) Foreign Application Priority Data

Dec. 18, 2007 (KR) .................. 10-2007-0133815

(51) Int. Cl.
*C07F 9/145* (2006.01)
*C08F 228/02* (2006.01)
*C08F 220/10* (2006.01)
*C08F 230/08* (2006.01)
*C08F 220/06* (2006.01)
*C08F 220/12* (2006.01)
*C08L 69/00* (2006.01)
*C08F 220/56* (2006.01)
*C08L 33/06* (2006.01)

(52) U.S. Cl.
CPC ............ *C08F 230/08* (2013.01); *C08F 228/02* (2013.01); *C08F 220/10* (2013.01); *C08L 33/06* (2013.01); *C08F 220/06* (2013.01); *C08F 220/12* (2013.01); *C08L 69/00* (2013.01); *C08F 220/56* (2013.01)
USPC ............ 524/146; 524/502; 525/185; 526/319

(58) Field of Classification Search
USPC .................... 524/146, 502; 525/185; 526/319
See application file for complete search history.

(56) References Cited

U.S. PATENT DOCUMENTS

| | | | |
|---|---|---|---|
| 3,322,853 A | 5/1967 | Trementozzi et al. | |
| 3,839,513 A | 10/1974 | Patel | |
| 3,898,300 A | 8/1975 | Hilliard | |
| 4,027,073 A | 5/1977 | Clark | |
| 4,045,514 A | 8/1977 | Iwahashi et al. | |
| 4,062,909 A | 12/1977 | Morgan et al. | |
| 4,102,853 A | 7/1978 | Kawamura et al. | |
| 4,117,041 A | 9/1978 | Guschl | |
| 4,287,315 A | 9/1981 | Meyer et al. | |
| 4,303,772 A * | 12/1981 | Novicky | .................. 526/279 |
| 4,391,935 A | 7/1983 | Bialous et al. | |
| 4,400,333 A * | 8/1983 | Neefe | .................. 264/2.7 |
| 4,632,946 A | 12/1986 | Muench et al. | |
| 4,634,734 A | 1/1987 | Hambrecht et al. | |
| 4,692,488 A | 9/1987 | Kress et al. | |
| 4,745,029 A | 5/1988 | Kambour | |
| 4,883,835 A | 11/1989 | Buysch et al. | |
| 4,906,696 A | 3/1990 | Fischer et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 4,997,883 A | 3/1991 | Fischer et al. | |
| 5,061,558 A | 10/1991 | Fischer et al. | |
| 5,061,745 A | 10/1991 | Wittmann et al. | |
| 5,200,492 A | 4/1993 | Ohnaga et al. | |
| 5,204,394 A | 4/1993 | Gosens et al. | |
| 5,206,404 A | 4/1993 | Gunkel et al. | |
| 5,218,030 A | 6/1993 | Katayose et al. | |
| 5,219,907 A | 6/1993 | Niessner et al. | |
| 5,229,443 A | 7/1993 | Wroczynski | |
| 5,239,001 A | 8/1993 | Fischer et al. | |
| 5,274,031 A | 12/1993 | Eichenauer et al. | |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,306,778 A | 4/1994 | Ishida et al. | |

(Continued)

FOREIGN PATENT DOCUMENTS

| CA | 1 121 535 | 4/1982 |
|---|---|---|
| CN | 1377913 A | 11/2002 |

(Continued)

OTHER PUBLICATIONS

International Search Report in counterpart International Application No. PCT/KR2008/007157, dated May 28, 2009.
International Search Report in commonly owned International Application No. PCT/KR2008/07825 dated Aug. 28, 2009, pp. 1-2.
Machine translation of JP 2006-257284, pp. 1-27.
Office Action in commonly owned U.S. Appl. No. 12/880,209 mailed Feb. 16, 2011, pp. 1-10.
International Search Report in commonly owned International Application No. PCT/KR2008/07820 dated Jul. 28, 2009, pp. 1-2.
Final Office Action in commonly owned U.S. Appl. No. 12/880,209 mailed Jul. 29, 2011, pp. 1-9.
Advisory Action in commonly owned U.S. Appl. No. 12/880,209 mailed Nov. 4, 2011, pp. 1-4.

(Continued)

*Primary Examiner* — Hannah Pak
(74) *Attorney, Agent, or Firm* — Additon, Higgins & Pendleton, P.A.

(57) ABSTRACT

Disclosed herein is a branched (meth)acrylate copolymer prepared by polymerizing a monomer mixture comprising (A) about 20 to about 99.999% by weight of a (meth)acrylate monomer having a refractive index higher than methyl methacrylate; (B) about 0 to about 79.999% by weight of a monofunctional unsaturated monomer; and (C) about 0.001 to about 10% by weight of a crosslinking monomer. The copolymer has a refractive index of about 1.495 to about 1.590.

9 Claims, No Drawings

(56) References Cited

U.S. PATENT DOCUMENTS

| | | | |
|---|---|---|---|
| 5,449,557 A | 9/1995 | Liebler et al. |
| 5,451,650 A | 9/1995 | Siol et al. |
| 5,473,019 A | 12/1995 | Siol et al. |
| 5,605,962 A | 2/1997 | Suzuki et al. |
| 5,627,228 A | 5/1997 | Kobayashi |
| 5,643,981 A | 7/1997 | Yang et al. |
| 5,672,645 A | 9/1997 | Eckel et al. |
| 5,731,390 A | 3/1998 | Helmond et al. |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 * | 11/2007 | Yatake .......... 523/160 |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 8,507,594 B2 | 8/2013 | Kwon et al. |
| 8,541,506 B2 | 9/2013 | Kwon et al. |
| 8,557,912 B2 | 10/2013 | Chung et al. |
| 2001/0009946 A1 | 7/2001 | Catsman et al. |
| 2002/0042483 A1 * | 4/2002 | Vanderbilt ............ 526/264 |
| 2002/0115759 A1 | 8/2002 | Eckel et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0100307 A1 * | 5/2006 | Uerz et al. ............ 523/160 |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0240831 A1 | 9/2010 | Kim et al. |
| 2010/0256288 A1 | 10/2010 | Kim et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0160377 A1 | 6/2011 | Chung et al. |
| 2011/0160380 A1 | 6/2011 | Kwon et al. |

FOREIGN PATENT DOCUMENTS

| | | |
|---|---|---|
| CN | 101061179 A | 10/2007 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0149813 | 7/1985 |
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |
| EP | 1010725 A2 | 6/2000 |
| EP | 1 069 156 A1 | 1/2001 |
| EP | 1069154 A | 1/2001 |
| EP | 1209163 A1 | 5/2002 |
| EP | 2204412 A1 | 7/2010 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-316580 A | 11/2001 |
| JP | 2002-080676 A | 3/2002 |
| JP | 2002-348457 A | 12/2002 |
| JP | 2005-247999 A | 9/2005 |
| JP | 2006-131833 A | 5/2006 |
| JP | 2006-249288 A | 9/2006 |
| JP | 2006-249292 A | 9/2006 |
| JP | 2006-257126 A | 9/2006 |
| JP | 2006-257284 A | 9/2006 |
| JP | 2006-342246 A | 12/2006 |
| JP | 2007-023227 | 2/2007 |
| JP | 2008-292853 | 12/2008 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |

(56) References Cited

FOREIGN PATENT DOCUMENTS

| KR | 10-2000-0055347 A1 | 9/2000 |
|---|---|---|
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-079118 A | 9/2004 |
| KR | 10-0648114 B1 | 11/2006 |
| KR | 10-0767428 B1 | 10/2007 |
| KR | 885819 B1 | 2/2009 |
| KR | 10-902352 | 6/2009 |
| WO | 99 19383 A1 | 4/1999 |
| WO | 99/57198 A1 | 11/1999 |
| WO | 00 09518 A1 | 2/2000 |
| WO | 00/18844 A1 | 4/2000 |
| WO | 00 00544 A1 | 1/2001 |
| WO | 01/66634 A | 9/2001 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 | 1/2007 |
| WO | 2007/119920 A1 | 10/2007 |
| WO | 2007/140101 A1 | 12/2007 |
| WO | 2008/081791 A1 | 7/2008 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A1 | 10/2009 |

OTHER PUBLICATIONS

Search Report in commonly owned European Patent Application No. EP 01 27 4302 dated Mar. 4, 2005, pp. 1-4.
Office Action in commonly owned U.S. Appl. No. 11/768,592 mailed Apr. 8, 2009, pp. 1-9.
Notice of Allowance in commonly owned U.S. Appl. No. 11/647,101 mailed Dec. 29, 2008, pp. 1-7.
International Search Report in commonly owned International Application No. PCT/KR2006/005752, dated Mar. 27, 2007, pp. 1-2.
International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
Notice of Allowance in commonly owned U.S. Appl. No. 12/880,209 mailed Oct. 10, 2013, pp. 1-10.
Notice of Allowance in commonly owned U.S. Appl. No. 12/817,302 mailed Oct. 1, 2013, pp. 1-7.
Office Action in commonly owned U.S. Appl. No. 12/898,012 mailed Oct. 1, 2013, pp. 1-6.
International Search Report in commonly owned International Application No. PCT/KR2008/007838 mailed Aug. 18, 2009.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 mailed Nov. 8, 2011, pp. 1-10.
Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 mailed Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
Japanese Office Action in commonly owned Japanese Application No. 2010-539284, dated Sep. 11, 2012, pp. 1-3.
Office Action in commonly owned U.S. Appl. No. 12/631,018 mailed Apr. 26, 2012, pp. 1-12.
Office Action in commonly owned U.S. Appl. No. 12/642,904 mailed Mar. 27, 2012, pp. 1-7.
Notice of Allowance in commonly owned U.S. Appl. No. 12/642,904 mailed Jul. 2, 2012, pp. 1-8.
Office Action in commonly owned U.S. Appl. No. 12/817,302 mailed Mar. 29, 2012, pp. 1-5.
Office Action in commonly owned U.S. Appl. No. 12/884,549 mailed Aug. 21, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report in commonly owned European Application No. 08873329.0 dated Dec. 14, 2012, pp. 1-7.
Office Action in commonly owned U.S. Appl. No. 12/972,795 mailed Jan. 18, 2013, pp. 1-9.
European Search Report for commonly owned European Application No. EP 04808586, completed on Sep. 25, 2007.
Chinese Office Action in counterpart Chinese Application No. 200880128614.0 dated Mar. 7, 2012, pp. 1-5.
English-translation of Chinese Office Action in commonly owned Chinese Application No. 200880128614.0 dated Mar. 7, 2012, pp. 1-2.
Advisory Action in commonly owned U.S. Appl. No. 12/631,018 mailed Nov. 7, 2012, pp. 1-3.
Final Office Action in commonly owned U.S. Appl. No. 12/817,302 mailed Feb. 7, 2013, pp. 1-6.
Final Office Action in commonly owned U.S. Appl. No. 12/884,549 mailed Dec. 18, 2012, pp. 1-7.
Notice of Allowance in commonly owned U.S. Appl. No. 12/884,549 mailed Apr. 11, 2013, pp. 1-8.
European Search Report in commonly owned European Application No. 07024808, dated Mar. 18, 2008, pp. 1-2.
Machine Translation of JP 10-017762.
Derwent Abstract of JP 2002348457 (A) (2003).
Full English Translation of JP-10-017762 (2011).
Advisory Action in commonly owned U.S. Appl. No. 12/817,302 mailed May 16, 2013, pp. 1-5.
Office Action in commonly owned U.S. Appl. No. 12/898,012 mailed Dec. 21, 2012, pp. 1-6.
Notice of Allowance in commonly owned U.S. Appl. No. 12/972,795 mailed May 24, 2013, pp. 1-8.
Chinese Office Action in commonly owned Chinese Application No. 201010597679.9 dated Aug. 27, 2012, pp. 1-5.
European Search Report in commonly owned European Application No. 10194938.6 dated Jul. 21, 2011, pp. 1-5.
Notice of Allowance in commonly owned U.S. Appl. No. 12/961,877 mailed Jun. 19, 2013, pp. 1-10.
Final Office Action in commonly owned U.S. Appl. No. 12/961,877 mailed Nov. 28, 2012, pp. 1-10.
Advisory Action in commonly owned U.S. Appl. No. 12/961,877 mailed Mar. 12, 2013, pp. 1-2.
Office Action in commonly owned U.S. Appl. No. 12/961,877 mailed Jul. 30, 2012, pp. 1-14.

(56) References Cited

OTHER PUBLICATIONS

European Search Report in commonly owned European Application No. 08873425.6 dated May 29, 2012, pp. 1-5.
Office Action in commonly owned U.S. Appl. No. 12/971,333 mailed Aug. 27, 2012, pp. 1-12.
Final Office Action in commonly owned U.S. Appl. No. 12/971,333 mailed Dec. 10, 2012, pp. 1-11.
Notice of Allowance in commonly owned U.S. Appl. No. 12/971,333 mailed Jun. 27, 2013, pp. 1-9.
Office Action in commonly owned U.S. Appl. No. 12/971,333 mailed Jul. 11, 2013, pp. 1-7.

* cited by examiner

{#US 8,901,218 B2}

BRANCHED (METH)ACRYLATE COPOLYMER WITH HIGH REFRACTIVE INDEX AND METHOD FOR PREPARING THE SAME

CROSS-REFERENCE TO RELATED APPLICATIONS

This application is a continuation-in-part of International Application No. PCT/KR2008/007157, filed Dec. 4, 2008, pending, which designates the U.S., published as WO 2009/078602, and is incorporated herein by reference in its entirety, and claims priority therefrom under 35 USC Section 120. This application also claims priority under 35 USC Section 119 from Korean Patent Application No. 10-2007-0133815, filed Dec. 18, 2007, in the Korean Intellectual Property Office, the entire disclosure of which is also incorporated herein by reference.

FIELD OF THE INVENTION

The present invention relates to a branched (meth)acrylate copolymer with a high refractive index and a method for preparing the same.

BACKGROUND OF THE INVENTION

Recently, demand for high technology and multifunctional properties of housing materials is increasing as large and light-weight products are becoming a widespread trend. In particular, as the appearance of molded products has become important, there is a need for a material which can provide scratch resistance and high grade texture at the same time, in addition to a flame retardant material having stability against fire.

One method for obtaining scratch resistance and flame retardancy at the same time is to alloy a polycarbonate (PC) resin and a (meth)acrylate resin, such as polymethyl methacrylate (PMMA).

The polycarbonate resin has good mechanical strength, transparency, thermal stability, self-extinguishing property, and dimensional stability so that it has been widely used in electrical and electronic products and parts of automobiles. Further, the polycarbonate resin can obtain flame retardancy even with a small amount of flame retardant, compared to a conventional polymer, since its chemical structure allows good flame retardancy. However, good scratch resistance cannot be obtained only with the polycarbonate resin since it has a low pencil hardness of 2B or so.

On the other hand, although polymethyl methacrylate resin has good scratch resistance and a high pencil hardness of 3H~4H, it still has a disadvantage in that it can be difficult to impart sufficient flame retardancy to polymethyl methacrylate using conventional flame retardants.

Accordingly, a method of blending a PC resin and a PMMA resin has been suggested to improve both the scratch resistance and flame retardancy. However, although the PC resin and the PMMA resin are melt-kneaded at a high temperature, they may divide into separate phases due to their lack of compatibility. It is also very difficult for an alloy of PC and PMMA to be used in housings of electrical and electronic products. Due to the different refractive indices of the PC resin and the PMMA resin (1.59 and 1.49, respectively), the alloy of PC resin and PMMA resin may scatter light. This makes it difficult to provide color with high chroma, and a melt joining line is clearly shown during extrusion.

Korean Patent Publication Laid-open No. 2004-0079.118 discloses a method of lowering the molecular weight of polycarbonate during a kneading process using metal stearic acid ester in order to improve the compatibility between a polycarbonate resin and a (meth)acrylate resin. However, the method has a disadvantage in that a blend of the polycarbonate and the methacrylate resin has significantly low mechanical properties.

U.S. Pat. No. 4,027,073 discloses a method of coating the surface of a resin to improve scratch resistance. The method, however, requires an additional process step.

SUMMARY OF THE INVENTION

The present inventors have developed a branched (meth)acrylate copolymer that can provide high transparency and high colorability when alloyed with a polycarbonate resin and a method for preparing the same. The branched (meth)acrylate copolymer can be prepared by introducing a crosslinking monomer to the polymerization of a (meth)acrylate monomer having a refractive index higher than methyl methacrylate.

The resultant branched (meth)acrylate copolymer can have good compatibility with polycarbonate resin and can minimize deterioration of compatibility between a polycarbonate resin and a (meth)acrylate resin that can occur at high melting temperatures.

The branched (meth)acrylate copolymer of the invention further can have a refractive index that is similar to the refractive index of the polycarbonate resin. For example, the branched (meth)acrylate copolymer of the invention can have a refractive index of about 1.495 to about 1.590. The branched (meth)acrylate copolymer can also have an ultra-high molecular weight, for example about 100,000 to 5,000,000.

Because the refractive index of the branched (meth)acrylate copolymer of the invention can be similar to the refractive index of polycarbonate (i.e., the difference between the refractive indices can be minimized), the branched (meth)acrylate copolymer can minimize the deterioration of transparency and colorability of an blend or alloy of the branched (meth)acrylate copolymer and polycarbonate.

An aspect of the present invention provides a branched (meth)acrylate copolymer. The copolymer may be prepared by polymerizing a monomer mixture comprising (A) about 20 to about 99.999% by weight of a (meth)acrylate monomer having a refractive index higher than methyl methacrylate; (B) about 0 to about 79.999% by weight of a mono-functional unsaturated monomer; and (C) about 0.001 to about 10% by weight of a crosslinking monomer.

The (meth)acrylate monomer having a refractive index higher than methyl methacrylate (A) may have a refractive index of more than about 1.49 but not more than about 1.59.

The branched (meth)acrylate copolymer may have a weight average molecular weight of about 100,000 to about 5,000,000, and a refractive index of about 1.495 to about 1.590.

Another aspect of the present invention provides a novel method for preparing the branched (meth)acrylate copolymer. The method may comprise preparing a reaction solution by adding an initiator and a chain-transfer agent to a monomer mixture comprising an aromatic (meth)acrylate monomer, an aliphatic (meth)acrylate monomer, or a combination thereof having a refractive index of more than about 1.49 but not more than about 1.59 and a crosslinking monomer; and adding the reaction solution to an aqueous solution comprising a suspension stabilizer dissolved therein to conduct suspension polymerization at a temperature of about 70 to about 120° C.

The monomer mixture may further comprise a mono-functional unsaturated monomer (B).

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The Branched (Meth)Acrylate Copolymer

The branched (meth)acrylate copolymer of the present invention may comprise a unit derived from a (meth)acrylate monomer having a refractive index higher than methyl methacrylate and a unit derived from a crosslinking monomer.

In an exemplary embodiment, the branched (meth)acrylate copolymer may be prepared by polymerizing a monomer mixture comprising (A) about 20 to about 99.999% by weight of a (meth)acrylate monomer having a refractive index higher than methyl methacrylate; (B) about 0 to about 79.999% by weight of a mono-functional unsaturated monomer; and (C) about 0.001 to about 10% by weight of a crosslinking monomer. The branched (meth)acrylate copolymer may be prepared by any conventional polymerization method such as but not limited to bulk polymerization, solution polymerization, suspension polymerization and emulsion polymerization.

The (meth)acrylate monomer having a refractive index higher than methyl methacrylate (A) may have a refractive index of more than about 1.49 but not more than about 1.59. In some embodiments, the (meth)acrylate monomer may have a refractive index of about 1.50, 1.51, 1.52, 1.53, 1.54, 1.55, 1.56, 1.57, 1.58, or 1.59. Further, according to some embodiments of the present invention, the (meth)acrylate monomer can have a refractive index in a range from about any of the foregoing refractive indices to about any other of the foregoing refractive indices.

The (meth)acrylate monomer having a refractive index higher than methyl methacrylate (A) may be an aromatic methacrylate, an aliphatic methacrylate, or a combination thereof represented by the following Chemical Formula 1 or Chemical Formula 2 or a combination thereof.

[Chemical Formula 1]

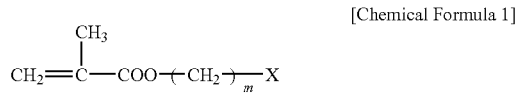

wherein m is an integer from 0 to 10, and X is comprises a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl, or a benzylphenyl group.

[Chemical Formula 2]

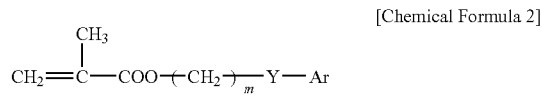

wherein m is an integer from 0 to 10, Y is oxygen (O) or sulfur (S), and Ar comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

Examples of the aromatic or aliphatic methacrylate may include, but are not limited to, cyclohexyl methacrylate, 2-ethylphenoxy methacrylate, 2-ethylthiophenyl methacrylate, phenyl methacrylate, phenoxyethyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, and 2-(4-benzylphenyl)ethyl methacrylate, and they may be used alone or in combination with one another.

The (meth)acrylate monomer (A) of the present invention may be used in an amount of about 20 to about 99.999% by weight, for example about 40 to about 99% by weight, as another example about 50 to about 99% by weight, and as yet another example about 60 to about 98% by weight, based on the total weight of the monomer mixture. In some embodiments, the (meth)acrylate monomer (A) may be used in amount of about 70 to about 98% by weight. In some embodiments, the (meth)acrylate monomer (A) may be used in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 99.999% by weight. Further, according to some embodiments of the present invention, the amount of the (meth)acrylate monomer (A) can be in a range from about any of the foregoing amounts to about any other of the foregoing amounts. When the (meth)acrylate monomer (A) is used in amount of about 20% by weight or more, a (meth)acrylate copolymer can obtain an average refractive index of about 1.495 or more.

The mono-functional unsaturated monomer (B) can be any vinyl monomer copolymerizable with the (meth)acrylate monomer (A).

Examples of the mono-functional unsaturated monomer (B) may include, but are not limited to, (meth)acrylic acid ester monomers (such as $C_1$-$C_8$ alkyl methacrylates and $C_1$-$C_8$ alkyl acrylates), unsaturated carboxylic acid monomers, acid anhydride monomers, hydroxyl group containing ester monomers (such as hydroxyl $C_1$-$C_8$ alkyl (meth)acrylates), (meth)acrylamide monomers, unsaturated nitrile monomers, aromatic vinyl compounds, allyl glycidyl ethers, glycidyl methacrylates, and the like, and combinations thereof. Specific examples of the mono-functional unsaturated monomer may include, but are not limited to, methacrylic acid ester monomers including methyl methacrylate, ethyl methacrylate, propyl methacrylate, and butyl methacrylate; acrylic acid ester monomers including methyl acrylate, ethyl acrylate, propyl acrylate, butyl acrylate, and 2-ethyl hexyl acrylate; unsaturated carboxylic acid monomers including acrylic acid and methacrylic acid; acid anhydride monomers including maleic anhydride; hydroxyl group containing ester monomers including 2-hydroxyethyl acrylate, 2-hydroxypropyl acrylate, and monoglycerol acrylate; (meth)acrylamide monomers including acrylamide and methacrylamide; unsaturated nitrile monomers including acrylonitrile and methacrylonitrile; and aromatic vinyl compounds such as styrenic monomers including styrene and α-methyl styrene. These monomers may be used alone or in combination with one another.

The monomer mixture may optionally comprise the mono-functional unsaturated monomer (B). The mono-functional unsaturated monomer (B) may be used in an amount of about 79.999% by weight or less, for example about 1 to about 60% by weight, as another example about 1.5 to about 50% by weight, and as yet another example about 2 to about 30% by weight. In some exemplary embodiments, the mono-functional unsaturated monomer (B) may be used in an amount of about 25% by weight or less. In exemplary embodiments, the mono-functional unsaturated monomer (B) may be present, i.e., in an amount greater than about 0% by weight. In exemplary embodiments, the mono-functional unsaturated monomer (B) may be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 79.999% by weight. Further, according to some embodiments, the amount of the mono-functional unsaturated monomer (B) can be in a range from about any of the foregoing amounts to about any other of the foregoing amounts. In other embodiments of the invention, the mono-functional unsaturated monomer (B) may not be present (i.e., 0% by weight).

A branch structure-forming monomer having at least two radical polymerizable unsaturated groups may be used as the crosslinking monomer (C).

The crosslinking monomer (C) may have a viscosity of about 0.1 cps to about 60,000 cps at 25° C. When the viscosity is about 0.1 cps or more, the branched structure can be formed, and when the viscosity is about 60,000 cps or less, easy control and improved productivity can be obtained. The crosslinking monomer (C) may have a viscosity of about 0.5 cps to about 15,000 cps, for example about 1 cps to about 6,000 cps. In an exemplary embodiment, the crosslinking monomer (C) may have a viscosity of about 0.1 cps to about 10 cps. In an exemplary embodiment, the crosslinking monomer (C) may have a viscosity of about 1 cps to about 50 cps. In another exemplary embodiment, the crosslinking monomer (C) may have a viscosity of about 60 cps to about 100 cps. In another exemplary embodiment, the crosslinking monomer (C) may have a viscosity of about 150 cps to about 500 cps. In another exemplary embodiment, the crosslinking monomer (C) may have a viscosity of about 700 cps to about 1,000 cps.

Examples of the crosslinking monomer (C) may include without limitation silane compounds, siloxane compounds, aromatic crosslinking monomers, vinyl group-containing monomers, allyl compounds, polyalkylene glycol di(meth)acrylate compounds, and the like, and combinations thereof.

Specific examples of the crosslinking monomer (C) may include without limitation silane or siloxane compounds including unsaturated hydrocarbon group-containing silicone-containing crosslinking monomers such as divinyl tetramethyl disiloxane and tetramethyl tetravinyl cyclotetrasiloxane; aromatic crosslinking monomers including divinylbenzene; vinyl group-containing monomers including 1,4-divinyloxybutane and divinylsulfone; allyl compounds including diallyl phthalate, diallylacrylamide, triallyl (iso) cyanurate, and triallyl trimelitate; and (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta (meth)acrylate, glycerol tri(meth)acrylate, and the like. They may be used alone or in combination with one another. Among them, silane or siloxane compounds represented by the following Chemical Formula 3 or Chemical Formula 4 may be used.

[Chemical Formula 3]

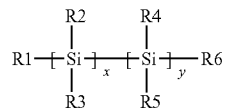

[Chemical Formula 4]

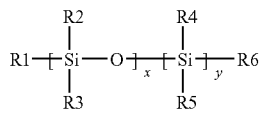

In each of Chemical Formula 3 and 4,

R1, R2, R3, R4, R5 and R6 may be the same or different and are independently hydrogen, a linear or branched $C_{1-5}$ alkyl group, a $C_{3-30}$ cycloaliphatic hydrocarbon group, such as a cyclohexyl, a $C_{6-10}$ aryl group, or a $C_{2-12}$ unsaturated hydrocarbon group, x is 1 to 20 and y is 1 to 20.

In an exemplary embodiment, R1, R2, R3, R4, R5 and R6 may be substituted with hydroxyl, $C_{1-20}$ alkoxy, amino, amide, epoxy, carboxyl, halogen, or ester. At least two of R1, R2, R3, R4, R5 and R6 may include a polymerizable unsaturated hydrocarbon group. In an exemplary embodiment, x+y may be from about 2 to about 40.

The crosslinking monomer (C) may be used in an amount of about 0.001 to about 10% by weight, for example about 0.01 to about 7% by weight, and as another example about 0.1 to about 5% by weight, in the (meth)acrylate copolymer. In some embodiments, the crosslinking monomer (C) may be used in an amount of about 0.001, 0.01, 0.1, 0.2, 0.3, 0.4, 0.5, 0.6, 0.7, 0.8, 0.9, 1, 2, 3, 4, 5, 6, 7, 8, 9, or 10% by weight. Further, according to some embodiments of the present invention, the amount of the crosslinking monomer (C) can be in a range from about any of the foregoing amounts to about any other of the foregoing amounts.

When the amount of the crosslinking monomer (C) is about 0.001% by weight or more, a branched structure may have an ultra-high molecular weight. When the amount is about 10% by weight or less, good processability and good compatibility with a polycarbonate resin can be obtained.

The branched (meth)acrylate copolymer may have a weight average molecular weight of about 100,000 to about 5,000,000, for example about 500,000 to about 4,000,000, and as another example about 700,000 to about 3,500,000.

As such, copolymer particles having a branched structure with an ultra-high molecular weight can prevent phase separation between the polycarbonate resin and the (meth)acrylate resin. Further, in the melt state, the phase separation may be minimized due to a decrease in viscosity so that compatibility between these heterogeneous resins may be improved.

The branched (meth)acrylate copolymer may have a high refractive index of about 1.50 to about 1.59. When the difference between the refractive index of the branched (meth) acrylate copolymer and the refractive index of the polycarbonate resin decreases, the deterioration of transparency and colorability which occurs in conventional mixtures due to the difference between the refractive indices may decrease. Accordingly, a mixture of a polycarbonate resin and a (meth) acrylate resin having improved compatibility and transparency can be obtained and thus a polycarbonate resin showing better transparency and colorability compared to conventional polycarbonate resins can be obtained.

Method for Preparing Branched (Meth)Acrylate Copolymer

Another aspect of the invention provides a method for preparing a branched (meth)acrylate copolymer. The method may comprise preparing a reaction solution by adding an initiator and a chain-transfer agent to a monomer mixture comprising an aromatic (meth)acrylate monomer, an aliphatic (meth)acrylate monomer, or a combination thereof having a refractive index higher than methyl methacrylate, for example, having a refractive index of more than about 1.49 but not more than about 1.59 (A) and a crosslinking monomer (C); and adding the reaction solution into an aqueous solution having a suspension stabilizer dissolved therein to conduct suspension polymerization at a temperature of about 70 to about 120° C.

The monomer mixture may further comprise a mono-functional unsaturated monomer (B).

In an exemplary embodiment, the monomer mixture may comprise (A) about 20 to about 99.999% by weight of an aromatic (meth)acrylate monomer, an aliphatic (meth)acrylate monomer or a combination thereof having a refractive index higher than methyl methacrylate; (B) about 0 to about 79.999% by weight of a mono-functional unsaturated monomer; and (C) about 0.001 to about 10% by weight of a crosslinking monomer.

The chain-transfer agents may be used for improving thermal stability as well as controlling molecular weight.

Examples of the chain-transfer agents suitable for use in the invention may comprise without limitation alkyl mercaptans represented by the formula of $CH_3(CH_2)_nSH$, such as n-butyl mercaptan, n-octyl mercaptan, n-dodecyl mercaptan, tertiary dodecyl mercaptan, isopropyl mercaptan, n-amyl mercaptan and the like; halogen compounds such as carbon tetrachloride and the like; and aromatic compounds such as α-methyl styrene dimer and α-ethyl styrene dimer.

In general, the amount of a chain-transfer agent may vary depending on its type. The amount of the chain-transfer agent can range from about 0.01 to about 10 parts by weight, per 100 parts by weight of the monomer mixture. If the amount of the chain-transfer agent is less than about 0.01 parts by weight, thermal decomposition may occur, which may deteriorate heat resistance. If the amount of the chain transfer agent is more than about 10 parts by weight, the resin obtained therefrom may have low molecular weight so that the mechanical properties may decrease.

Examples of the initiators may include without limitation octanoyl peroxide, decanoyl peroxide, lauroyl peroxide, benzoyl peroxide, monochlorobenzoyl peroxide, dichloro benzoyl peroxide, p-methyl benzoyl peroxide, tert-butyl perbenzoate, azobisisobutyronitrile, azobis-(2,4-dimethyl)-valeronitrile and the like. The initiators may be used in an amount of about 0.01 to about 1 part by weight per 100 parts by weight of the monomer mixture.

Also, the (meth)acrylate copolymer of the present invention may further comprise other one or more additives such as but not limited to lubricants, UV absorbing agents, pigments, antioxidants and the like, and combinations thereof. These additives may be added without limitation during polymerization or the pelletization process.

In an exemplary embodiment, at least one or more additives such as lubricants, UV absorbing agents, pigments, antioxidants, and the like, and combinations thereof may be added to the reaction solution during the polymerization process.

Examples of the antioxidants may include without limitation octadecyl 3-(3,5-di-tertiary butyl-4 hydroxyphenyl)propionate, triethylene glycol-bis-3(3-tertiary butyl-4-hydroxy-5-methylphenyl)propionate, 2,6-di-tertiary butyl-4-methyl phenol, 2,2'-methylenebis(4-methyl-6-tertiary-butylphenol), tris(2,4-di-tertiary-butylphenyl)phosphite, n-octadecyl-3 (3,5-di-tertiarybutyl-4-hydroxyphenyl)propionate, 1,3,5-tri (3,5-di-tertiary-butyl-4-hydroxybenzyl)isocyanate, 3-3,5-di-tertiary-butyl-4-hydroxyphenyl)propionate, distearylthiodipropionate, laurylthiopropionate methane, and diphenylisooctyl phosphite, and the like, and combinations thereof.

Examples of the suspension stabilizers may include without limitation organic suspension stabilizers such as polyalkylacrylate-acrylic acid, polyolefin-maleic acid, polyvinyl alcohol, cellulose and the like, inorganic suspension stabilizers such as tricalcium phosphate and the like, and combinations thereof.

In the present invention, suspension stabilization aids may be used together with the suspension stabilizers. Examples of the suspension stabilization aids suitable for use in the present invention may include without limitation disodium hydrogen phosphate or sodium dihydrogen phosphate. Also, sodium sulfate, and the like may be employed to control solubility of an aqueous polymer or monomer.

The (meth)acrylate resin composition with high refractive index may be prepared by polymerization reaction which can be conducted at about 70 to about 120° C. for about 2 to about 8 hours.

The method of the present invention may further comprise pelletizing the branched (meth)acrylate copolymer after polymerization.

In an exemplary embodiment, the resultant product prepared from the polymerization reaction may be washed, dehydrated and dried to obtain the copolymer in bead form. The copolymer in bead form may be extruded to obtain pellets.

In another exemplary embodiment, at least one or more additives such as but not limited to lubricants, UV absorbing agents, pigments, antioxidants and the like and combinations thereof may be added to the branched (meth)acrylate copolymer during the pelletizing process.

The copolymer prepared from the above method may have a branched structure, a weight average molecular weight of about 100,000 to about 5,000,000, and a high refractive index ranging from about 1.50 to about 1.59. Accordingly, when polycarbonate is alloyed with the branched (meth)acrylate copolymer with a high refractive index, the problems of the deterioration of transparency and colorability caused by the difference between the refractive index of a conventional polycarbonate resin and the refractive index of a (meth)acrylate resin can be overcome, and thus it is possible to obtain a thermoplastic resin having improved scratch resistance, transparency and colorability due to improved compatibility of the two resins.

Accordingly, the thermoplastic resin composition having good scratch resistance, transparency and colorability prepared by alloying the branched (meth)acrylate copolymer with the polycarbonate resin can be used for various plastic products requiring good physical properties, and can be specifically used in electrical and electronic products and parts of automobiles as well as lens and window glasses.

The invention may be better understood by reference to the following examples which are intended for the purpose of illustration and are not to be construed as in any way limiting the scope of the present invention, which is defined in the claims appended hereto.

EXAMPLES

Example 1

To a monomer mixture comprising 40 parts by weight of phenyl methacrylate, 40 parts by weight of cyclohexyl methacrylate, 17 parts by weight of methyl methacrylate, 2.5 parts by weight of methylacrylate, and 0.5 parts by weight of divinyltetramethyldisiloxane are added 0.3 parts by weight of lauroyl peroxide and 0.31 parts by weight of normal-octyl mercaptan, and the monomer mixture is stirred to form a homogeneous mixture.

Disodium hydrogen phosphate and sodium sulfate as suspension stabilization aids are dissolved in 110 parts by weight of ion exchanged water in a stainless steel high-pressure reactor having stirring equipment, and 0.15 parts by weight of polyethylacrylate-methylacrylic acid with a molecular weight of 1,000,000 or more as a suspension stabilizer is added thereto and stirred. To the aqueous solution in which the suspension stabilizer is dissolved is added the monomer mixture and stirred intensively while purging the reactor with an inert gas such as nitrogen, argon, and the like and heating the reactor. The reaction is conducted at 72° C. for 2 hours, then 110° C. for one hour to complete the polymerization reaction. The resultant product is washed, dehydrated and dried to obtain the polymer in particle form. Then, the molecular weight of the polymer is measured. The polymer particles are extruded and injected into a test specimen. The physical properties of the test specimen are measured. The results are shown in Table 1.

Example 2

Example 2 is conducted in the same manner as in Example 1 except a monomer mixture comprising 40 parts by weight of phenyl methacrylate, 57 parts by weight of cyclohexyl methacrylate, 2.5 parts by weight of methylacrylate, and 0.5 parts by weight of divinyltetramethyldisiloxane are used.

Example 3

Example 3 is conducted in the same manner as in Example 1 except a monomer mixture comprising 40 parts by weight of benzyl methacrylate, 40 parts by weight of cyclohexyl methacrylate, 17 parts by weight of methyl methacrylate, 2.5 parts by weight of methylacrylate, and 0.5 parts by weight of divinyltetramethyldisiloxane is used.

Example 4

Example 4 is conducted in the same manner as in Example 1 except a monomer mixture comprising 40 parts by weight of benzyl methacrylate, 57 parts by weight of cyclohexyl methacrylate, 2.5 parts by weight of methylacrylate, and 0.5 parts by weight of divinyltetramethyldisiloxane is used.

Example 5

Example 5 is conducted in the same manner as in Example 1 except a monomer mixture comprising 40 parts by weight of phenoxyethyl methacrylate, 40 parts by weight of cyclohexyl methacrylate, 17 parts by weight of methyl methacrylate, 2.5 parts by weight of methylacrylate, and 0.5 parts by weight of divinyltetramethyldisiloxane is used.

Example 6

Example 6 is conducted in the same manner as in Example 1 except a monomer mixture comprising 40 parts by weight of phenoxyethyl methacrylate, 57 parts by weight of cyclohexyl methacrylate, 2.5 parts by weight of methylacrylate, and 0.5 parts by weight of divinyltetramethyldisiloxane is used.

Example 7

Example 7 is conducted in the same manner as in Example 1 except a monomer mixture comprising 40 parts by weight of phenyl methacrylate, 40 parts by weight of cyclohexyl methacrylate, 17 parts by weight of methyl methacrylate, 2.5 parts by weight of methylacrylate, and 0.5 parts by weight of divinylbenzene is used.

Comparative Example 1

Comparative Example 1 is conducted in the same manner as in Example 1 except a monomer mixture comprising 97.5 parts by weight of methyl methacrylate and 2.5 parts by weight of methylacrylate is used.

Comparative Example 2

Comparative Example 2 is conducted in the same manner as in Example 1 except a monomer mixture comprising 97 parts by weight of methyl methacrylate, 2.5 parts by weight of methylacrylate and 0.5 parts by weight of divinyltetramethyldisiloxane is used.

The results of the physical properties and input amount of monomers in the Examples and Comparative Examples are shown in Table 1.

TABLE 1

| | | | Examples | | | | | | | Comparative Examples | |
|---|---|---|---|---|---|---|---|---|---|---|---|
| | | | 1 | 2 | 3 | 4 | 5 | 6 | 7 | 1 | 2 |
| Monomer | A | Phenyl methacrylate | 40 | 40 | — | — | — | — | 40 | — | — |
| | | Benzyl methacrylate | — | — | 40 | 40 | — | — | — | — | — |
| | | phenoxyethyl methacrylate | — | — | — | — | 40 | 40 | — | — | — |
| | | Cyclohexyl methacrylate | 40 | 57 | 40 | 57 | 40 | 57 | 40 | — | — |
| | B | Methyl methacrylate | 17 | — | 17 | — | 17 | — | 17 | 97.5 | 97 |
| | | Methylacrylate | 2.5 | 2.5 | 2.5 | 2.5 | 2.5 | 2.5 | 2.5 | 2.5 | 2.5 |
| | C | Divinyltetramethyl-disiloxane | 0.5 | 0.5 | 0.5 | 0.5 | 0.5 | 0.5 | — | — | 0.5 |
| | | Divinylbenzene | — | — | — | — | — | — | 0.5 | — | — |

TABLE 1-continued

| | | Examples | | | | | | | Comparative Examples | |
|---|---|---|---|---|---|---|---|---|---|---|
| | | 1 | 2 | 3 | 4 | 5 | 6 | 7 | 1 | 2 |
| Properties of copolymer | Molecular weight (×1000) | 930 | 753 | 1758 | 1542 | 2919 | 2918 | 3500 | 92 | 3461 |
| | Refractive index ($n_D$) | 1.530 | 1.534 | 1.530 | 1.534 | 1.530 | 1.534 | 1.531 | 1.489 | 1.484 |

Method for Measuring the Physical Properties (1) Molecular weight: the relative weight average molecular weight is measured by using a standard polystyrene polymer as a reference and the elution curve of samples obtained by using gel permeation chromatography (GPC).

(2) Refractive Index: the refractive index is measured by using a refractometer manufactured by ATAGO Co. Ltd. of Japan (product name: DR-A1) at a sample thickness of 2.5 mm.

As shown in Table 1, Examples 1 to 7 exhibit excellent refractive index as compared with Comparative Examples 1 to 2 using other acrylic monomers.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A branched (meth)acrylate copolymer prepared by polymerizing a monomer mixture comprising (A) about 20 to less than about 99.999% by weight of a (meth)acrylate monomer having a refractive index higher than methyl methacrylate, wherein said (meth)acrylate monomer having a refractive index higher than methyl methacrylate (A) has a refractive index of more than about 1.49 but not more than about 1.59; (B) greater than about 0 to about 79.999% by weight of a mono-functional unsaturated monomer comprising a C1-C8 alkyl methacrylate; C1-C8 alkyl acrylate; acid anhydride monomer; (meth)acrylamide monomer; unsaturated nitrile monomer; allyl glycidyl ether; glycidyl methacrylate; aromatic vinyl monomer; or a combination thereof; and (C) about 0.001 to about 10% by weight of a crosslinking monomer comprising a silane compound; siloxane compound; aromatic crosslinking monomer; vinyl group-containing monomer; allyl compound; or a combination thereof, wherein the weight average molecular weight of the branched (meth) acrylate copolymer is from about 500,000 to about 5,000,000.

2. The branched (meth)acrylate copolymer of claim 1, wherein said (meth)acrylate monomer having a refractive index higher than methyl methacrylate (A) comprises an aromatic methacrylate, an aliphatic methacrylate, or a combination thereof represented by the following Chemical Formula 1, Chemical Formula 2, or a combination thereof:

[Chemical Formula 1]

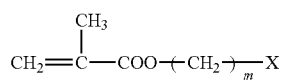

wherein m is an integer from 0 to 10, and X comprises a cyclohexy group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group;

[Chemical Formula 2]

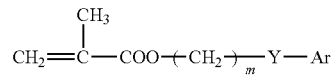

wherein m is an integer from 0 to 10, Y is oxygen (O) or sulfur (S), and Ar comprises a cyclohexyl group, a phenyl group, a methylphenyl group, a methylethylphenyl group, a methoxyphenyl group, a cyclohexylphenyl group, a chlorophenyl group, a bromophenyl group, a phenylphenyl group, or a benzylphenyl group.

3. The branched (meth)acrylate copolymer of claim 2, wherein said aromatic or aliphatic methacrylate comprises 2-ethylphenoxy methacrylate, 2-ethylthiophenyl methacrylate, phenyl methacrylate, phenoxyethyl methacrylate, benzyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenyl)ethyl methacrylate, 2-(4-methoxyphenyl)ethylmethacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenyl)ethyl methacrylate, 2-(3-phenylphenyl)ethyl methacrylate, 2-(4-benzylphenyl)ethyl methacrylate, or a combination thereof.

4. The branched (meth)acrylate copolymer of claim 1, wherein C1-C8 alkyl methacrylate comprises methyl methacrylate, ethyl methacrylate, propyl methacrylate, butyl methacrylate or a combination thereof said C1-C8 alkyl acrylate comprises methyl acrylate, ethyl acrylate, propyl acrylate, butyl acrylate, 2-ethyl hexyl acrylate, or a combination thereof; said acid anhydride monomer comprises maleic anhydride; said (meth)acrylamide monomer comprises acrylamide, methacrylamide, or a combination thereof said unsaturated nitrile monomer comprises acrylonitrile, methacrylonitrile, or a combination thereof and said aromatic vinyl monomer comprises styrene, α-methyl styrene, or a combination thereof.

5. The branched (meth)acrylate copolymer of claim 1, wherein said silane or siloxane compound comprises an unsaturated hydrocarbon group-containing silicone-containing crosslinking monomer; said aromatic crosslinking monomer comprises divinylbenzene; said vinyl group-containing monomer comprises 1,4-divinyloxybutane, divinylsulfone, or a combination thereof; and said allyl compound comprises diallyl phthalate, diallylacrylamide, triallyl (iso)cyanurate, triallyl trimelitate, or a combination thereof.

6. The branched (meth)acrylate copolymer of claim 1, wherein said silane or siloxane compounds is represented by the following Chemical Formula 3 or Chemical Formula 4 or a combination thereof:

[Chemical Formula 3]

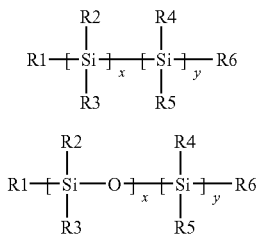

[Chemical Formula 4]

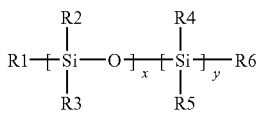

wherein R1, R2, R3, R4, R5 and R6 may be the same or different and are independently hydrogen, a C1-5 linear or branched alkyl group, a C3-30 cycloaliphatic hydrocarbon group, a C6-10 aryl group, or a C2-12 unsaturated hydrocarbon group, x is 1 to 20 and y is 1 to 20.

7. The branched (meth)acrylate copolymer of claim 6, wherein at least two of R1, R2, R3, R4, R5 and R6 are C2-12 unsaturated hydrocarbon groups.

8. The branched (meth)acrylate copolymer of claim 6, wherein said x+y is 2 to 40.

9. The branched (meth)acrylate copolymer of claim 1, wherein the monomer mixture comprises (A) about 20 to about 99% by weight of a (meth)acrylate monomer having a refractive index higher than methyl methacrylate.

* * * * *

UNITED STATES PATENT AND TRADEMARK OFFICE
CERTIFICATE OF CORRECTION

PATENT NO.       : 8,901,218 B2
APPLICATION NO.  : 12/792176
DATED            : December 2, 2014
INVENTOR(S)      : Il Jin Kim et al.

Page 1 of 1

It is certified that error appears in the above-identified patent and that said Letters Patent is hereby corrected as shown below:

In the Specification

Column 2, Line 1 reads: "Korean Patent Publication Laid-open No. ~~2004-0078.118~~"
and should read: "Korean Patent Publication Laid-open No. 2004-0078118"

Column 6, Line 15-20, Chemical Formula 4 is depicted as:

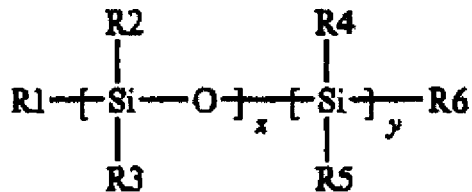

and should be depicted as:

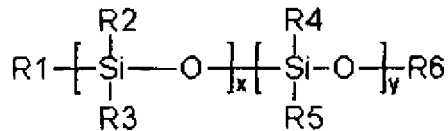

In the Claims

Column 13, Line 10-15, In Claim 6, Chemical Formula 4 is depicted as:

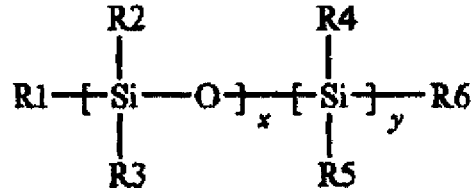

and should be depicted as:

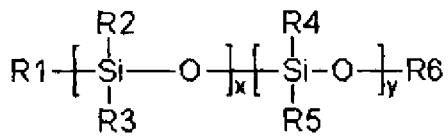

Signed and Sealed this
Twenty-sixth Day of May, 2015

Michelle K. Lee
*Director of the United States Patent and Trademark Office*